(12) United States Patent
Tanwar et al.

(10) Patent No.: US 10,484,163 B2
(45) Date of Patent: Nov. 19, 2019

(54) MEASURE AND IMPROVE CLOCK SYNCHRONIZATION USING COMBINATION OF TRANSPARENT AND BOUNDARY CLOCKS

(71) Applicant: Cisco Technology, Inc., San Jose, CA (US)

(72) Inventors: Anshul Tanwar, Bangalore (IN); Vineet Kumar Garg, Bangalore (IN); N V Hari Krishna N, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/782,915

(22) Filed: Oct. 13, 2017

(65) Prior Publication Data

US 2019/0116021 A1 Apr. 18, 2019

(51) Int. Cl.
*H04J 3/06* (2006.01)
*H04L 7/00* (2006.01)

(52) U.S. Cl.
CPC .......... *H04L 7/0033* (2013.01); *H04J 3/0667* (2013.01); *H04J 3/0673* (2013.01); *H04J 3/0641* (2013.01)

(58) Field of Classification Search
None
See application file for complete search history.

(56) References Cited

U.S. PATENT DOCUMENTS

| | | | | |
|---|---|---|---|---|
| 6,185,217 B1* | 2/2001 | Ando | ............ | H04J 3/0655 370/403 |
| 8,718,482 B1* | 5/2014 | Roberts | ............ | H04B 10/27 398/102 |
| 9,998,247 B1* | 6/2018 | Choudhury | ...... | H04J 3/0685 |
| 2013/0077509 A1* | 3/2013 | Hirota | ............ | H04L 47/56 370/252 |
| 2014/0169792 A1* | 6/2014 | Lee | ............ | H04J 3/0673 398/66 |
| 2014/0177653 A1* | 6/2014 | Tzeng | ............ | H04J 3/0635 370/503 |
| 2015/0071309 A1* | 3/2015 | Aweya | ............ | H04J 3/0682 370/503 |
| 2018/0013508 A1* | 1/2018 | Rabinovich | ...... | H04J 3/0667 |

* cited by examiner

*Primary Examiner* — Gerald A Smarth
(74) *Attorney, Agent, or Firm* — Polsinelli PC

(57) ABSTRACT

The present technology improves synchronization of a slave node with a master node in a network using PTP packets in which the slave node is coupled to the working master node through at least one boundary node. The technology establishes a synchronization communication session between the boundary node and the slave node in which the synchronization communication session is configured to measure a first timing delay from the boundary node to the slave node, and establishes a transparent communication session between the master node and the slave node through the boundary timing node in which the transparent communication session configured to measure a second timing delay from the master node to the slave node. Using the sessions, the technology adjusts a timing delay correction factor according to the first timing delay and the second timing delay, and synchronizes the slave node with the master node according to the correction factor.

20 Claims, 5 Drawing Sheets

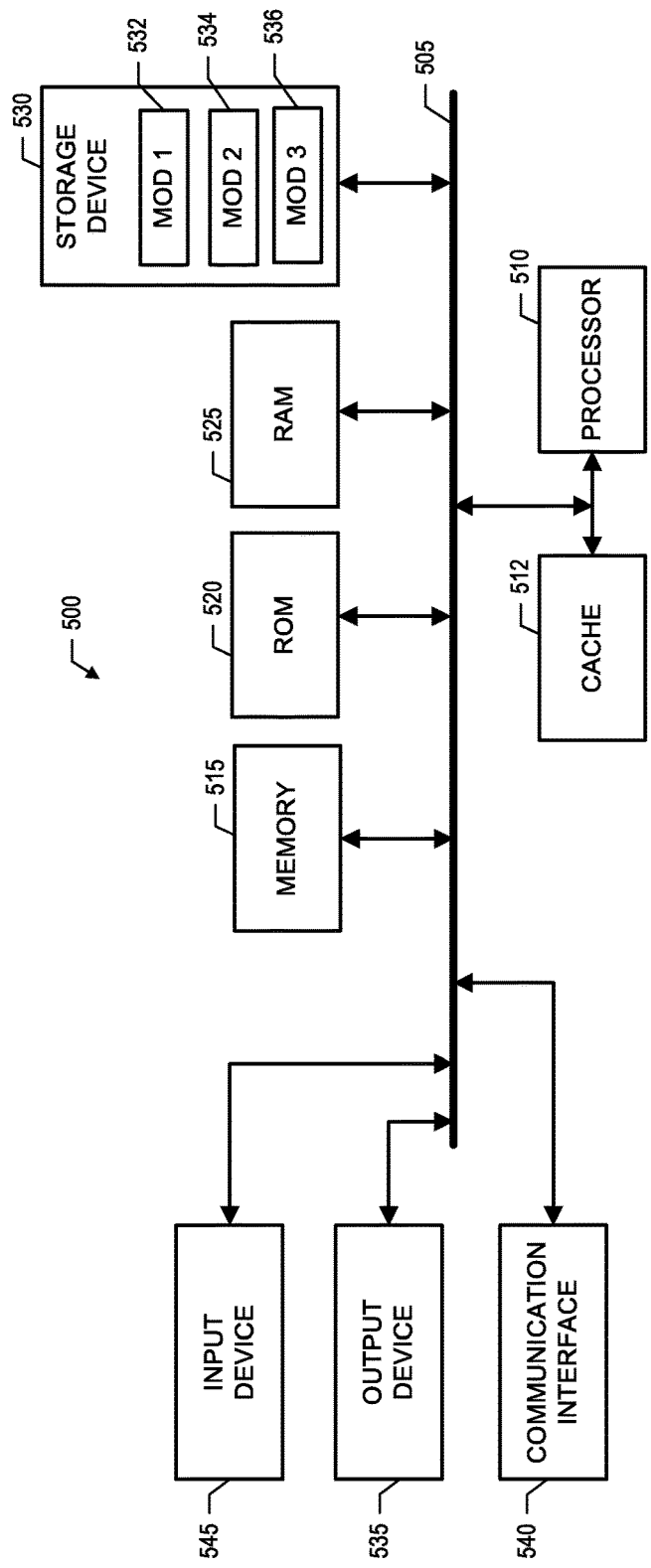

MEASURE AND IMPROVE CLOCK SYNCHRONIZATION USING COMBINATION OF TRANSPARENT AND BOUNDARY CLOCKS

TECHNICAL FIELD

The disclosure relates generally to computer networks, and more particularly, to a system and method to measure and improve clock synchronization using a combination of transparent and boundary clocks.

BACKGROUND

Synchronization is important for telecommunication network performance. Frequency and time (e.g., time-of-day) synchronization is crucial for communication networks, such as those implemented in mobile backhaul architectures. Examples of network synchronization protocols developed to provide this synchronization includes plesiochronous digital hierarchy (PDH), synchronous digital hierarchy (SDH), network time protocol (NTP), precision time protocol (PTP), and various GNSS-based synchronization techniques. Of these protocols, PTP is particular advantageous in that it is designed to overcome latency and jitter issues inherent in the other protocols, and in many cases, can provide accuracy in the nanosecond range.

The PTP is defined according to the Institute of Electrical and Electronics Engineers (IEEE) 1588 standard. In general, the PTP standard is a packet timing technology designed to provide precise timing for communication networks. A communication network typically includes a core network having a master node, and one or more boundary nodes and/or slave nodes that are synchronized to the master node. The PTP standard is compatible with most or all Ethernet and Internet protocol (IP) networks. Additionally, the PTP standard is designed to enable a properly designed network to deliver frequency and phase or time with precision rivalling GNSS-based synchronization schemes.

Although PTP-based systems add a small amount of additional traffic to the network load, they have several advantages. First, they work in the data path, and also benefit from the redundancy and resiliency mechanisms of the network, resulting in relatively reliable operation. Additionally, multiple transmission paths reduce redundant clock system costs. They also use a single synchronization session for all base station traffic. The PTP standard supports almost any generic packet-based transport (e.g., IP, MPLS, etc.). The PTP standard also features configurable synchronization packet rates for network conditions to maintain accuracy.

The transmission of the clock information over a packet network eliminates the need for alternative mechanisms, such as GNSS communication or prohibitively expensive oscillators placed at each of the slave nodes. This provides significant cost savings in network equipment as well as in ongoing installation and maintenance. This synchronization solution transmits dedicated timing packets, which flow along the same paths with the data packets, reducing the cost of synchronization and simplifying implementation.

BRIEF DESCRIPTION OF THE DRAWINGS

The disclosure will be readily understood by the following detailed description in conjunction with the accompanying drawings in which:

FIG. 5 illustrates the basic computing components of a computing device according to some embodiments of the present disclosure.

DESCRIPTION OF EXAMPLE EMBODIMENTS

Overview

Figure 1:
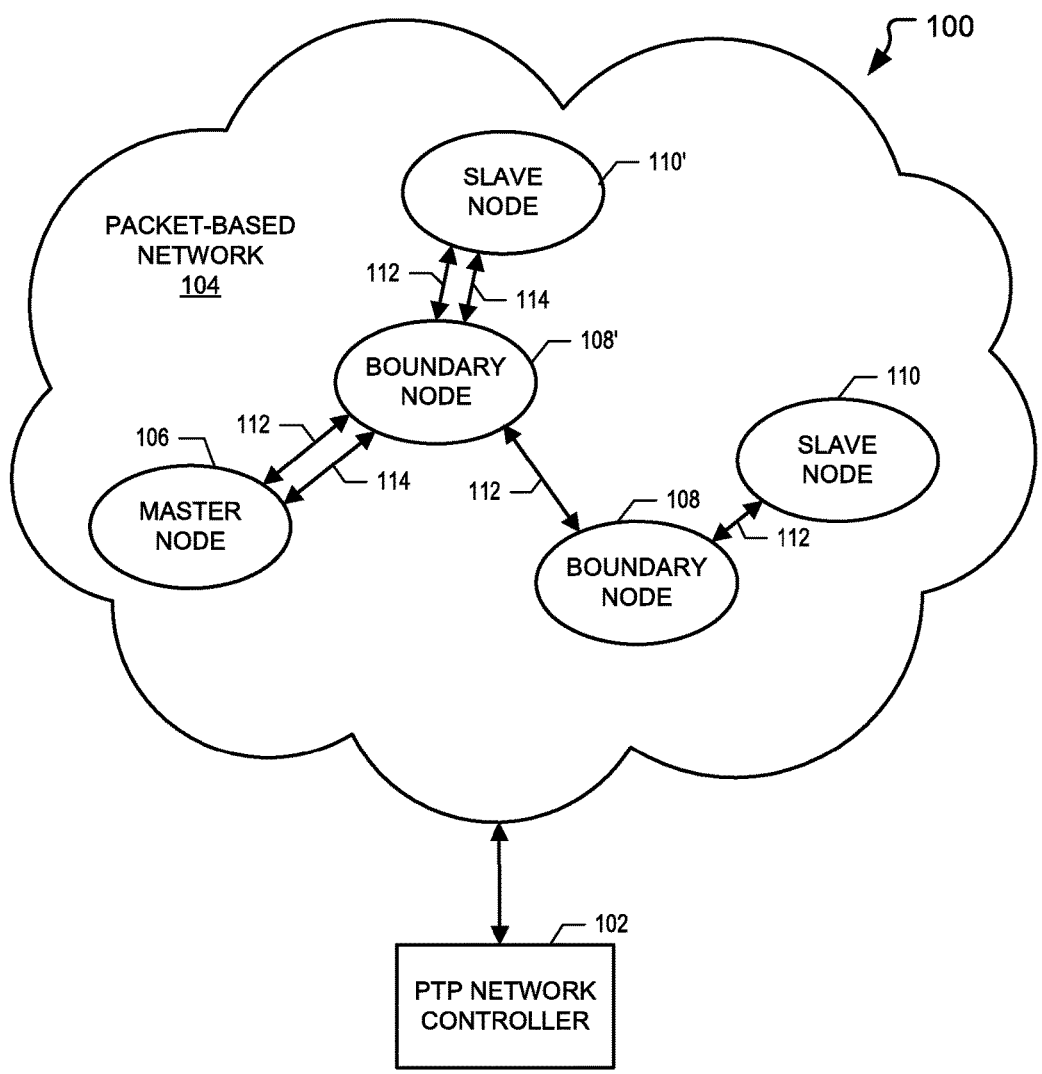
FIG. 1 illustrates an example network time synchronization system according to some embodiments of the present disclosure.

Disclosed are systems, methods and computer-readable devices related to a time synchronization protocol for packet-based networks (e.g., Ethernet, IP, MPLS, etc.) in which direct a transparent communication session is provided between a master node and a slave node along with a conventional communication session in a communication network so that certain slave nodes may be synchronized with the master node. In conventional PTP implementations, certain slave nodes may be configured in the network such that they are indirectly synchronized from one or more boundary nodes, a situation in which the slave node may inherit a cumulative synchronization offset from each of the boundary nodes. Embodiments of the present disclosure provide a solution to this problem by configuring a boundary node with a conventional communication session that is used to carry live traffic, and a transparent communication session directly from the slave node to the master node so that the slave node may obtain an amount of timing offset between the slave node and master node. Using the identified timing offset along with an obtained timing offset between the slave node and an adjacent boundary node, the system may adjust a measured time delay obtained through the conventional communication session to report an accurate network time error of the slave node, and in some instances, adjust the clock of the slave to reduce the overall timing offset between the master node and the slave node.

Description

The Precision Time Protocol (PTP) standard is a packet timing technology designed to provide precise timing for communication networks, and in particular, Ethernet communication networks. To ensure that packet-based communication technologies have the necessary attributes to be carrier grade, communication service providers are introducing several key technologies for the transport of timing and synchronization over packet networks. Of these, the PTP standard is beneficial because it provides both frequency and time distribution for the nodes in the communication network.

In the PTP standard, a master node is the root timing reference in the PTP domain and transmits synchronization information to other nodes residing in its domain. In the PTP standard, messages are categorized as event or general messages. Event messages are timed messages in that an accurate timestamp is generated at both transmission and receipt of each message. Event messages should be accurately timestamped since the accuracy in transmission and receipt timestamps directly affects clock distribution accuracy. A timestamp event is generated at the time of transmission and reception of any event message. General messages are typically not required to be timestamped. The set of event messages includes Sync, Delay_Req, Pdelay_Req, and Pdelay_Resp messages. The set of general includes Announce, Follow_Up, Delay_Resp, Pdelay_Resp_Follow_Up, Management, and Signaling messages.

The Sync, Delay_Req, Follow_Up, and Delay_Resp messages are used to generate and communicate timing information needed to synchronize ordinary and boundary clocks using the delay request-response mechanism. A Sync message is transmitted by a master node to its slave node and either contains the exact time of its transmission or is followed by a Follow_Up message containing this time. In an ordinary or boundary clock, the Follow_Up message communicates the value of the departure timestamp for a particular Sync message. A Delay_Req message is a request for the receiving node to return the time at which the Delay_Req message was received, using a Delay_Resp message.

The basic pattern of Sync message exchange is initiated by transmitting a Sync message from the master node to a slave node in which the Sync message include a time T1 that it was sent. The salve node receives the Sync message and notes the time of reception T2. Next, the slave node transmits a Delay_Req message back to the master node in which the Delay_Req message includes the time T3 at which it was sent. The master node receives the Delay_Req message and notes the time of reception T4. The master node responds by conveying, to the slave node, the timestamp T4 by embedding it in a Delay_Resp message. At the end of this PTP message exchange, the slave node possesses all four timestamps {T1, T2, T3, T4}. These timestamps may be used to compute the offset of the slave node's clock with respect to the master node and the mean propagation time of messages between the two clocks. The computation of offset and propagation time assumes that the master-to-slave and slave-to-master propagation times are equal.

While Ethernet communication networks have proven to be a ubiquitous and inexpensive medium for connectivity, it has not been traditionally well-suited for applications requiring precise synchronization. For example, when the backhaul transitions from Ethernet to another network with a differing communication protocol, a slave node (e.g., base station) can become isolated from its master network synchronization feed due to prevalent changes in the network topology. To minimize this problem, boundary clock nodes should have a direct transparent communication session with the master clock node so that any synchronization offset is maintained at a sufficiently low level. Nevertheless, due to network infrastructure and cost implications, providing direct transparent communication sessions to the master node for each boundary node is often not practical.

FIG. 1 illustrates an example network time synchronization system 100 according to the present disclosure that may provide a solution to the aforementioned problems with packet-based networks implemented with a PTP-based system. The network time synchronization system 100 includes a PTP network controller 102 in communication with an example packet-based network 104 in which a time synchronization system, such as a PTP standard may be embodied. In the particular embodiment shown, the packet-based network 104 is configured with a time synchronization system functioning according to the PTP standard; nevertheless, the packet-based network 104 may be configured with any suitable time synchronization protocol that may benefit from the teachings of the present disclosure.

The packet-based network 104 includes multiple nodes in which one node is configured as a master node 106, and one or more boundary nodes 108, and/or slave nodes 110, which are synchronized to the master node 106 via a synchronization communication session 112 established between each adjacent node in the packet-based network 104 according to the PTP standard. As will be described in detail herein below, the PTP network controller 102 may be provided to establish a transparent communication session 114 from at least one slave node 110' to the master node 106 so that the slave node may identify a level of timing offset directly between the slave node 110 and the master node 106, and use the identified timing offset to adjust the clock of the slave to reduce the overall timing offset between the master node and the slave node.

According to the PTP standard, the packet-based network 104 may include slave nodes and boundary nodes. Slave nodes are ordinary nodes that obtain synchronization from the master node. Due to relatively long distances that the slave nodes may be configured from the master node, boundary nodes 108 are provided to distribute time synchronization to one or more slave nodes within a given geographical region. For example, according to the PTP standard, boundary node 108' is synchronized directly with the master node 106, while the slave node 110' is synchronized with the boundary node 108'.

To maintain relatively tight synchronize tolerances for today's communication networks that operate at high speeds (e.g., 40 GbE, 100 GbE, etc.), slave nodes 110 should have no more than one boundary node 108 configured between it and the master node 106 to reduce synchronization offset. Nevertheless, due to network infrastructure and cost implications caused by various factors, such as geographical constraints, costs of coupling each boundary node directly to the master node, and the like, more than one boundary node 108 may be configured between a slave node 110 and the master node 106 such that the slave node 110 obtains its synchronization sequentially through multiple boundary nodes 108. Thus, a slave node 110 obtaining its synchronization from the master node 106 may incur the inherent timing variations of all boundary nodes 108 configured between it and the master node 106.

Embodiments of the present disclosure provide a solution to this problem by establishing a transparent communication session 114 between a slave node 110' and the master node 106 so that the slave node 110' may adjust its clock according to a measured time offset measured through the transparent communication session 114. Buffering (e.g., queuing) delays in a node can cause variable delay to packets, which affects path delay measurements. Buffering delays vary based on the network load and may also depend on the architecture of the node. Using the transparent communication session 114, the boundary node 108 measures the residence time (e.g., the time that the packet spends passing through the boundary node 108), and adds the residence time into the correction field of the PTP packet to adjust for the packet delay. Thus, the slave node 110 can account for the packet delay by using both the timestamp of when it started and the information in the correction field. Thus, the slave node 110 may be alleviated of any synchronization offset levels that may exist in any boundary nodes 108 configured between it and the master node 106.

According to the PTP standard, the transparent communication session 114 may be established through the boundary node 108' along with the conventional synchronization communication session 112. When the boundary node 108 is configured with a transparent communication session, it may use, for example, delay_Req, Pdelay_Resp and Pdelay_Resp_Follow_Up messages to measure delays across the communications medium so that they can be compensated for by the network time synchronization system 100. Thus, to accurately synchronize the slave node 110 to the master node 106, the time offset derived by the slave node 110 using the transparent communication session 114 may be obtained by subtracting the offset obtained via the synchronization communication session 112. That is, the synchronize offset may be obtained according to equation Synchronize Offset=synchronized communication session offset−transparent communication session offset.

Embodiments of the present disclosure may provide certain benefits not heretofore recognized using conventional time synchronization techniques provided by conventional usage of the PTP standard. For example, the architecture provided by embodiments of the present disclosure may make it possible to have an effective reference clock available to any node, regardless of its distance or number of hops (e.g., number of boundary nodes) from the master node 106. This feature could also be useful to measure, calibrate, and possibly correct the clock offset in the slave node 110 from the master node 106 by comparing the reference clock in the master node 106 with the clock in the slave node 110. Whereas conventional calibration techniques have often involved expensive synchronization calibration equipment that were required to be located at the site where the slave node 110 is at, embodiments of the present disclosure may enable reasonably good calibration remotely and without the need for expensive equipment. Also, currently existing transparent clock (TC) implementations have a relatively high degree of accuracy such that the accuracy impact due to calibration using the TC would not be high.

Additionally, while using the master node 106 to provide synchronization service to all nodes in the packet-based network 104 can cause certain scale related issues, the system 100 can provide an on-demand technique to check the clock accuracy of available clock sources throughout the packet-based network 104. For example, a user, via the PTP network controller 102, can trigger any node to start a transparent communication session to the master node 106 temporarily, and use this connection to measure and/or calibrate the clock in adjacent nodes. This information can be used to configure a local priority of available clock sources so that a best one is chosen for clock recovery.

The packet-based network 104 may include any suitable packet-based communication network. For example, the packet-based network 104 may be a local area network (LAN), an intranet, or form a portion of the Internet. Additionally, the master node 106, the boundary nodes 108, and slave nodes 110 may communicate with one another using any suitable communication protocol, such as Hypertext Transfer Protocol (HTTP), extensible markup language (XML), extensible hypertext markup language (XHTML), or a Wireless Application Protocol (WAP) protocol.

Figure 2:
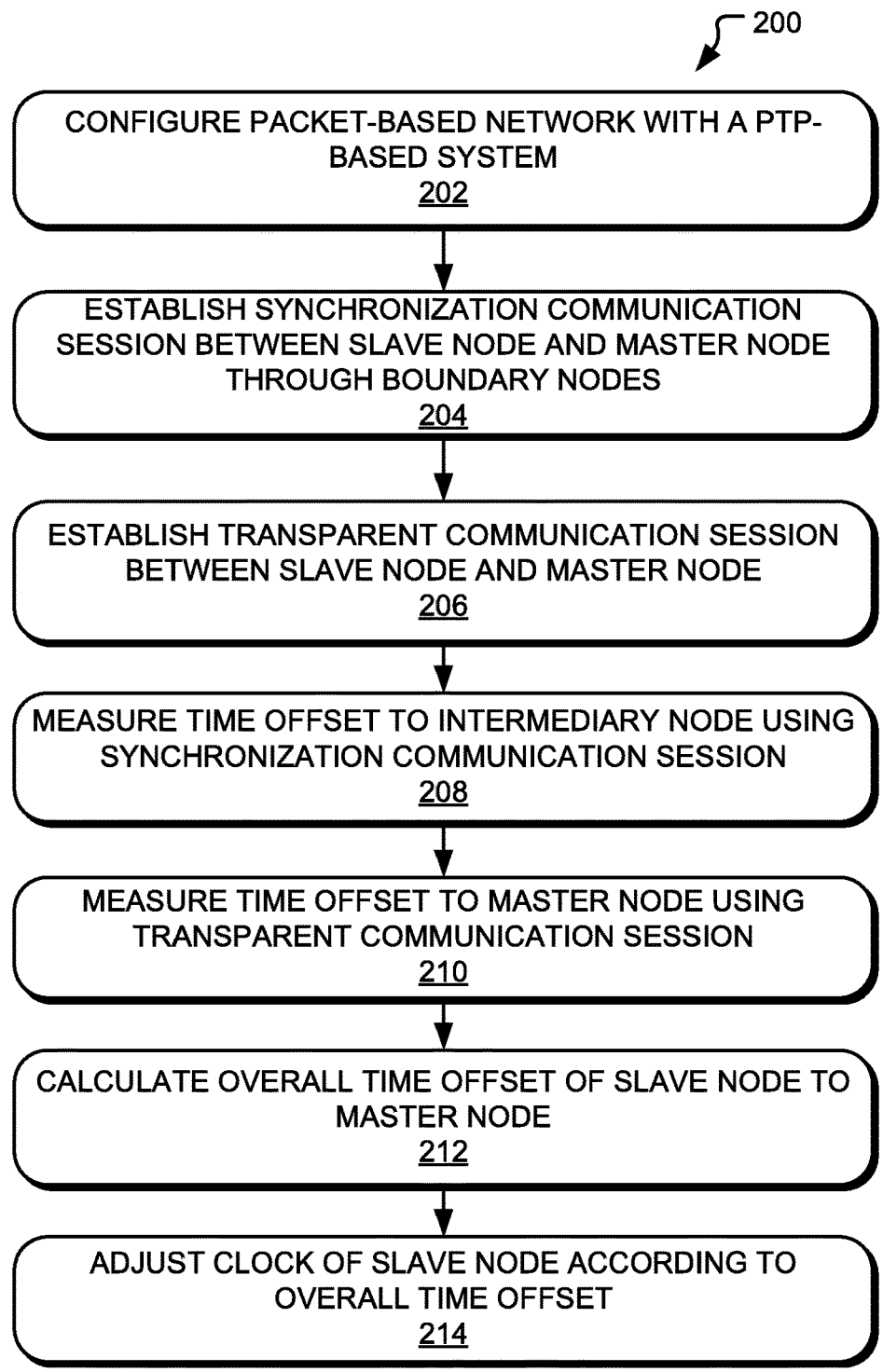
FIG. 2 illustrates an example process that may be performed by the system to synchronize a slave node against the master node in a packet-based network comprising a PTP standard according to some embodiments of the present disclosure.

FIG. 2 illustrates an example process 200 that may be performed by the system 100 to synchronize a slave node, against the master node 106 in a packet-based network 104 comprising a PTP standard. The steps of the following process may be performed by the PTP network controller 102, by the master node 106, the boundary nodes 108 and slave nodes 110, or any suitable combination thereof. For example, each of the master node 106, the boundary nodes 108, and the slave nodes 110 may include instructions stored in a non-transitory, computer-readable medium that is executed by at least one processor for performing the process described herein below.

At step 202, the packet-based network 104 is configured with logic for performing the PTP standard. That is, each of the master node 106, boundary nodes 108, and slave nodes 110 may be configured with software that may be used for implementing the PTP standard. Additionally, each of the master node 106, boundary nodes 108, and slave nodes 110 may be configured with an internal clock that may be used to precisely time communication traffic through its respective node.

At step 204, synchronization communication sessions 112 are established between a slave node 110 and a master node 106 through each boundary node 108. For example, the synchronization communication session 112 may be established using logic configured in each of the master node 106, boundary nodes 108, and slave nodes 110 to convey event messages using port number 319 of the IP standard, and general messages using port number 320 of the IP standard.

At step 206, a transparent communication session may be established between the slave node and the master node 106. Any slave node having at least one boundary node between it and the master node 106 may be selected for synchronization. For example, a particular slave node 110 experiencing a relatively large amount of lost communication traffic (e.g., excessively high bit error rate (BER)) may be selected for being configured with the transparent communication session 114.

At step 208, the slave node 110 measures a synchronization communication session offset between it and its adjacent boundary node. For example, the slave node 110 and the boundary node may use the Sync, Delay_Req, Follow_Up, and Delay_Resp messages as prescribed by the PTP standard to measure the synchronization communication session offset. Thereafter at step 210, the slave node 110 measures a transparent communication session offset between it and the master node 106 using the transparent communication session established at step 206.

When the synchronized communication session offset and transparent communication session offset have been measured, the slave node 110 may then calculate an overall synchronize offset of the slave node 110 relative to the master node 106 by subtracting the synchronization communication session offset from the transparent communication session offset at step 212. The overall offset may be reported to a user, such as via a user interface of the PTP network controller 102 For example, a user (e.g., network operator) may view the overall offset to determine what if any configuration changes in the packet-based network 104 should be taken to reduce timing inconsistencies between the slave node 110 and the master node 106. The overall offset may also be applied to adjust the internal clock of the slave node 110 to synchronize it with the internal clock of the master node 106 at step 214.

The steps described above may be repeatedly performed to synchronize the slave node 110 directly with the master node 106 at ongoing intervals in the future. For example, the steps may be performed periodically, or on-demand in response to a request from a user, such as through the user interface of the PTP network controller 102. As another example, the steps may be performed according to a triggering event, such as in response to a change in the packet-based network 104 (e.g., addition or deletion of a boundary node in the packet-based network 104), or a bit error rate of a particular communication channel through the slave node 110 that exceeds a threshold value. Nevertheless, when use of the network synchronize system is no longer needed or desired, the process ends.

Although FIG. 2 describes one example of a process that may be performed for synchronizing a slave node with the master node 106, the features of the disclosed process may be embodied in other specific forms without deviating from the spirit and scope of the present disclosure. For example, the process 200 may include additional, fewer, or different operations than those operations as described in the present example. As another example, the steps of the process described herein may be performed by the nodes (e.g., master node 106, boundary nodes 108, and slave nodes 110), by the PTP network controller 102, or by a combination of the nodes and the PTP network controller 102.

Figure 3:
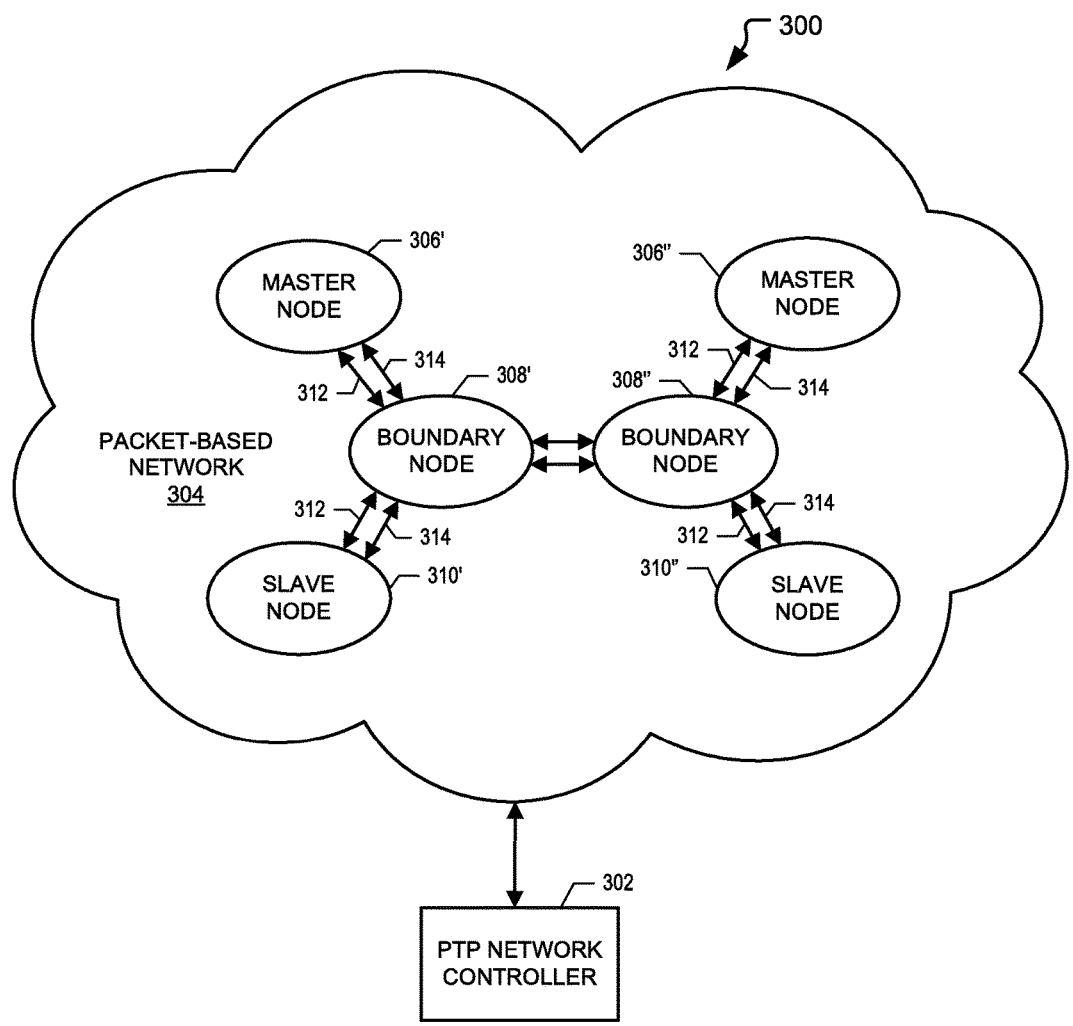
FIG. 3 illustrates another example network time synchronization system according to the present disclosure that may be used to provide for selection of one master node from among multiple available master nodes configured in a packet-based network according to some embodiments of the present disclosure.

FIG. 3 illustrates another example network time synchronization system 300 according to the present disclosure that may be used to provide for selection of one master node 306 from among multiple master nodes 306 configured in a packet-based network 304. Like the packet-based network 104 of FIG. 1, the packet-based network 304 includes multiple nodes in which one node is configured as a master node 306, and one or more boundary nodes 308, and/or slave nodes 310 that are synchronized to the master node 306 via a synchronized communication session 312 established according to the PTP standard. The packet-based network 304 of FIG. 3 differs, however, in that it includes multiple available master nodes 306 that are available for use as the master node from which the other slave nodes and boundary nodes may be synchronized.

In general, the PTP standard provides a best master clock algorithm (BMCA) that provides for selection of one master node from among multiple available master nodes. The selection may be based upon several factors including a priority level assigned to each master node, a clock class (e.g., locked PTP epoch, holdover PTP epoch, locked ARB epoch, holdover ARB epoch, unlocked PTP epoch, unlocked ARB epoch, etc.), nominal clock accuracy, clock variance, and the like. Nevertheless, the conventional BMCA has not traditionally used a measured clock accuracy because the multi-hop technique used by the PTP standard has not provided sufficient accuracy to warrant its usage. Embodiments of the present disclosure, however, may provide sufficient accuracy to allow use of measured accuracy seen by one or more of the slave nodes to provide for selection of a master node.

In general, only one master node 306 should be used for synchronizing the slave nodes and the boundary nodes. Nevertheless, multiple nodes capable of being the master node may be configured in a given packet-based network. Additionally, the relative accuracy of these available master nodes may change over time due to various factors, such as due to the addition or deletion of boundary nodes to or from the packet-based network 304, or failure or degradation in the performance of one of the available master nodes 306. Thus, the network synchronize system 300 may be used to aid in selection of an available master node from among multiple master nodes 306 based upon a measure accuracy of each of the master nodes.

In some embodiments, one or multiple slave nodes may be used for selecting a master node 306. For example, a first slave node 310' in communication with a first boundary node 308' may be used to select from a first master node 306' that provides synchronization to the first boundary node 308', while a second slave node 310" in communication with a second boundary node 308" may be used to select from a second master node 306" that provides synchronization to the second boundary node 308". Because the first boundary node 308' and the second boundary node 308" are in communication with one another, synchronization for the packet-based network 304 may be provided by either of the first master node 306' or the second master node 306". When both slave nodes 310' and 310" measures an overall offset from each of the master nodes 306' and 306", those slave nodes 310' and 310" may select one master node 306 according to an arbitration process, such as by selecting one master node 306 in which the overall offset for both slave nodes 310' and 310" is lowest, or another suitable arbitration process.

The network synchronization system 300 may also include a PTP network controller 302 for controlling the operation of the system 300. Nevertheless, the operation of the network synchronization system 300 may be performed by the nodes of the packet-based network 304, or by a combination of the PTP network controller 302 and the slave nodes and/or boundary nodes of the packet-based network 300.

Figure 4:
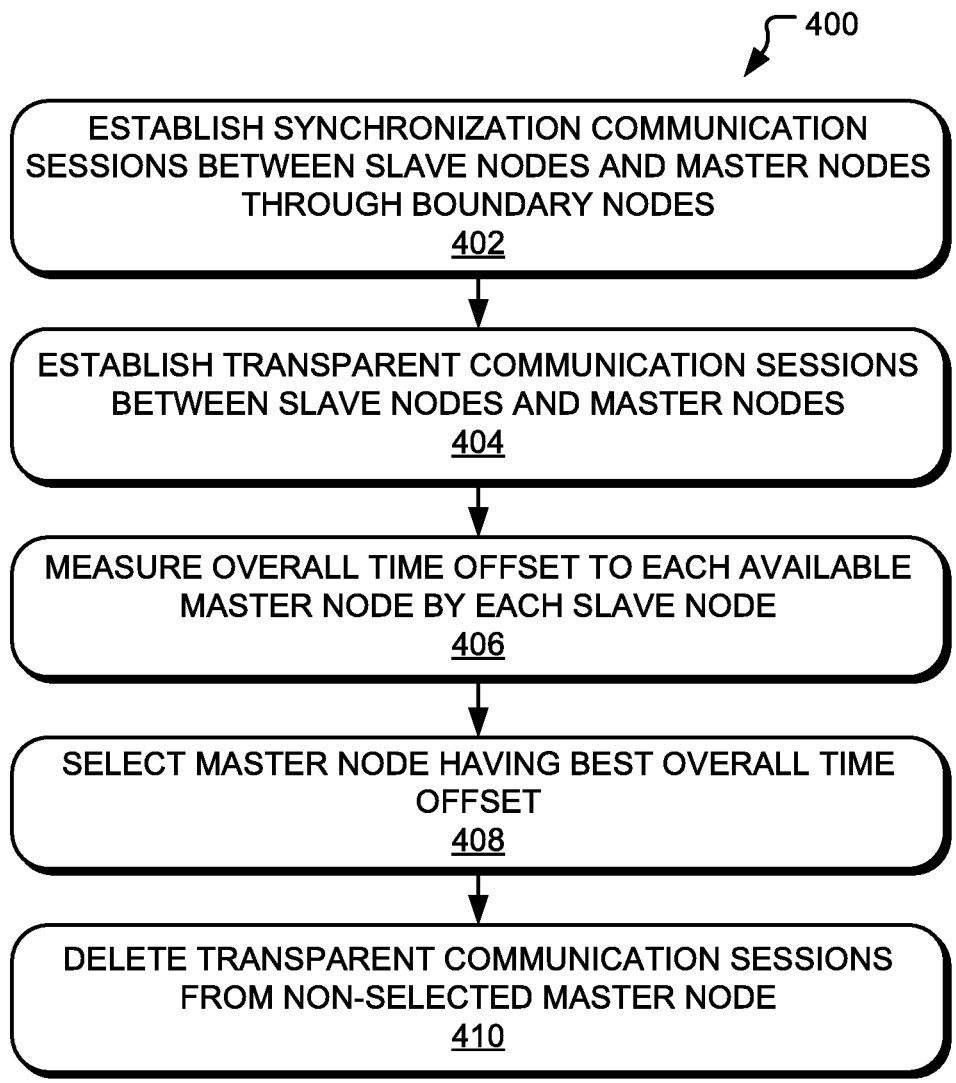
FIG. 4 illustrates an example process that may be performed by the system to select a master node from among multiple available master nodes in the packet-based network according to some embodiments of the present disclosure.

FIG. 4 illustrates an example process 400 that may be performed by the system 300 to select a master node 306 from among multiple master nodes 306 in the packet-based network 304 according to some embodiments of the present disclosure. Initially, one of the master nodes 306 may be functioning as the master node 306 according to the PTP standard, or none of the master nodes 306 may be functioning as the master node 306. One example of when neither of the available master nodes 306 are functioning as the master node 306 includes initial turn-up of the packet-based network 304 in which no node has been previously assigned to be the master node 306.

At step 402, synchronization communication sessions 112 are established between the slave node 310 and a master nodes 306 through the boundary nodes 308 as defined according to the PTP standard. At step 404, a transparent communication session may be established between the slave nodes 310 and each of the master nodes 306. Thereafter at step 406, the slave nodes 310 measures an overall offset between themselves and the available master nodes 306. For example, each of the slave nodes 310 may measure the overall offset as described above at steps 208-212 of FIG. 2.

At step 408, the slave nodes 310 may select one of the master nodes 306. In some embodiments, the slave nodes 310 may select one of the master nodes 306 according to an arbitration process, such as by selecting a master node 306 having a minimum overall offset for either or both slave nodes 310. In some embodiments, a new telemetry message (e.g., "offset from master") may be added to the PTP standard in order to convey this information between the slave nodes 310 for selecting the one master node 306 to be the working master node. In another embodiment, the master node 306 selection process may include weighting factors to be applied to each available master node 306. For example, a weighting factor may be applied to each measured overall offset for some reason, such as a preferred available master node 306, geographical constraints of one available master node 306 relative to another available master node 306, and the like.

Once a master node 306 has been selected, the transparent communication sessions of the non-selected master nodes 306 may be deleted at step 410. Thereafter, operation of the packet-based network 304 according to the PTP standard continues with the selected master node 306.

The steps described above may be repeatedly performed to select one master node 306 from among multiple available master nodes 306. For example, the steps may be performed periodically so that the best master node 306 is selected at ongoing intervals for enhanced performance of the packet-based network 304. As another example, the steps above may be performed on-demand in response to a request from the user (e.g., network operator) due to some change in the condition of the packet-based network 304, such as due to failure or degradation in performance of one of the nodes, or in the currently selected master node 306 in the packet-based network 304. Nevertheless, when use of the network synchronize system is no longer needed or desired the process ends.

Although FIG. 4 describes one example of a process that may be performed for selecting a master node 306 from among multiple master nodes 306, the features of the disclosed process may be embodied in other specific forms without deviating from the spirit and scope of the present disclosure. For example, the process 400 may include additional, fewer, or different operations than those operations as described in the present example. As another example, the steps of the process described herein may be performed by any quantity of slave nodes, such as only one slave node, three or more slave nodes 310, or a combination of slave nodes 310 and boundary nodes 308.

FIG. 5 illustrates several basic hardware components that can apply to system examples of the present disclosure. For example, the master nodes 106 and 306, boundary nodes 108 and 308, slave nodes 110 and 310, and PTP network controllers 102 and 302 may include certain hardware components as described herein.

With reference to FIG. 5, an exemplary system and/or computing device 500 includes a processing unit (CPU or processor) 510 and a system bus 505 that couples various system components including the system memory 515 such as read only memory (ROM) 520 and random access memory (RAM) 525 to the processor 510. The system 502 can include a cache 512 of high-speed memory connected directly with, in close proximity to, or integrated as part of the processor 510. The system 502 copies data from the memory 515, 520, and/or 525 and/or the storage device 530 to the cache 512 for quick access by the processor 510. In this way, the cache provides a performance boost that avoids processor 510 delays while waiting for data. These and other modules can control or be configured to control the processor 510 to perform various operations or actions. Other system memory 515 may be available for use as well. The memory 515 can include multiple different types of memory with different performance characteristics. It can be appreciated that the disclosure may operate on a computing device 500 with more than one processor 510 or on a group or cluster of computing devices networked together to provide greater processing capability. The processor 510 can include any general purpose processor and a hardware module or software module, such as module 1 532, module 2 534, and module 3 536 stored in storage device 530, configured to control the processor 510 as well as a special-purpose processor where software instructions are incorporated into the processor. The processor 510 may be a self-contained computing system, containing multiple cores or processors, a bus, memory controller, cache, etc. A multi-core processor may be symmetric or asymmetric. The processor 510 can include multiple processors, such as a system having multiple, physically separate processors in different sockets, or a system having multiple processor cores on a single physical chip. Similarly, the processor 510 can include multiple distributed processors located in multiple separate computing devices, but working together such as via a communications network. Multiple processors or processor cores can share resources such as memory 515 or the cache 512, or can operate using independent resources. The processor 510 can include one or more of a state machine, an application specific integrated circuit (ASIC), or a programmable gate array (PGA) including a field PGA.

The system bus 505 may be any of several types of bus structures including a memory bus or memory controller, a peripheral bus, and a local bus using any of a variety of bus architectures. A basic input/output system (BIOS) stored in ROM 520 or the like, may provide the basic routine that helps to transfer information between elements within the computing device 500, such as during start-up. The computing device 500 further includes storage devices 530 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 530 is connected to the system bus 505 by a drive interface. The drives and the associated computer-readable storage devices provide non-volatile storage of computer-readable instructions, data structures, program modules and other data for the computing device 500. In one aspect, a hardware module that performs a particular function includes the software component stored in a tangible computer-readable storage device in connection with the necessary hardware components, such as the processor 510, bus 505, an output device such as a display 535, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the computing device 500 is a small, handheld computing device, a desktop computer, or a computer server. When the processor 510 executes instructions to perform "operations", the processor 510 can perform the operations directly and/or facilitate, direct, or cooperate with another device or component to perform the operations.

Although the exemplary embodiment(s) described herein employs a storage device such as a hard disk 530, other types of computer-readable storage devices which can store data that are accessible by a computer, such as magnetic cassettes, flash memory cards, digital versatile disks (DVDs), cartridges, random access memories (RAMs) 525, read only memory (ROM) 520, a cable containing a bit stream and the like, may also be used in the exemplary operating environment. According to this disclosure, tangible computer-readable storage media, computer-readable storage devices, computer-readable storage media, and computer-readable memory devices, expressly exclude media such as transitory waves, energy, carrier signals, electromagnetic waves, and signals per se.

To enable user interaction with the computing device 500, an input device 545 represents any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems enable a user to provide multiple types of input to communicate with the computing device 500. The communications interface 540 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 510. The functions these blocks represent may be provided through the use of either shared or dedicated hardware, including, but not limited to, hardware capable of executing software and hardware, such as a processor 510, that is purpose-built to operate as an equivalent to software executing on a general purpose processor. For example, the functions of one or more processors presented in FIG. 5 can be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 520 for storing software performing the operations described below, and random access memory (RAM) 525 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 502 shown in FIG. 5 can practice all or part of the recited methods, can be a part of the recited systems, and/or can operate according to instructions in the recited tangible computer-readable storage devices. Such logical operations can be implemented as modules configured to control the processor 510 to perform particular functions according to the programming of the module. For example, FIG. 5 illustrates three modules Mod1 532, Mod2 534 and Mod3 536 which are modules configured to control the processor 510. These modules may be stored on the storage device 530 and loaded into RAM 525 or memory 515 at runtime or may be stored in other computer-readable memory locations.

One or more parts of the example computing device 500, up to and including the entire computing device 500, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 510 can include all types of processors disclosed herein, including a virtual processor. However, when referring to a virtual processor, the processor 510 includes the software components associated with executing the virtual processor in a virtualization layer and underlying hardware necessary to execute the virtualization layer. The system 502 can include a physical or virtual processor 510 that receive instructions stored in a computer-readable storage device, which cause the processor 510 to perform certain operations. When referring to a virtual processor 510, the system also includes the underlying physical hardware executing the virtual processor 510.

The various aspects disclosed herein can be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the examples. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, computer-readable storage device, or a machine-readable medium excludes signals or signals embodied in carrier waves.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A network time synchronization management system comprising:
  a computing device in communication with a communication network comprising a slave node coupled to a working master node through at least one boundary node, the computing device comprising at least one non-transitory computer readable medium comprising instructions stored thereon that when executed are effective to cause at least one processor to:
    receive a request to synchronize the slave node with the working master node;
    establish a first communication session between the boundary node and the slave node, the first communication session configured to measure a first timing delay from the boundary node to the slave node;

establish a second communication session between the working master node and the slave node through the boundary node, the second communication session configured to measure a second timing delay from the working master node to the slave node;

adjust a timing delay correction factor according to the first timing delay and the second timing delay; and synchronize the slave node with the working master node according to the adjusted timing delay correction factor;

wherein the first and second communications sessions are different from each other.

2. The network time synchronization management system of claim 1, wherein the instructions are further executed to display the adjusted timing delay correction factor on a display.

3. The network time synchronization management system of claim 1, wherein the request is received according to at least one of a manual request and at one of a plurality of automated requests issued at ongoing intervals.

4. The network time synchronization management system of claim 1, wherein the instructions are further executed to:
identify a plurality of available master nodes in the communication network;
establish the first and second communication sessions, adjust the timing delay correction factor, and synchronize the slave node on each of the available master nodes; and
select one of the available master nodes to be the working master node based upon the adjusted timing delay correction factor determined for each available master node.

5. The network time synchronization management system of claim 4, wherein the instructions are further executed to receive the request from a plurality of slave nodes, wherein the slave nodes conduct an arbitration process to select one of the available master nodes to be the working master node.

6. The network time synchronization management system of claim 5, wherein the first and second communication sessions conform to an IEEE 1588 protocol, wherein the slave nodes are executed to conduct the arbitration process using a telemetry message conveyed among the slave nodes.

7. The network time synchronization management system of claim 1, wherein the request is received as a result of a trigger event from a communication channel through the slave node.

8. A network time synchronization management method comprising:
receiving, by at least one processor that executes instructions stored in at least one memory, a request to synchronize a slave node with a working master node, the slave node coupled to the working master node through at least one boundary node;
establishing, using the instructions, a first communication session between the boundary node and the slave node, the first communication session configured to measure a first timing delay from the boundary node to the slave node;
establishing, using the instructions, a second communication session between the working master node and the slave node through the boundary timing node, the second communication session configured to measure a second timing delay from the working master node to the slave node;

adjusting, using the instructions, a timing delay correction factor according to the first timing delay and the second timing delay; and synchronizing, using the instructions, the slave node with the working master node according to the adjusted timing delay correction factor;

wherein the first and second communications sessions are different from each other.

9. The network time synchronization management method of claim 8, further comprising receiving the request according to at least one of a manual request and one of a plurality of requests automatically issued at ongoing intervals.

10. The network time synchronization management method of claim 8, further comprising:
identifying a plurality of available master nodes;
establishing the first and second communication sessions, adjust the timing delay correction factor, and synchronize the slave node on each of the available master nodes; and
selecting one of the available master nodes to be the working master node based upon the adjusted timing delay correction factor determined for each available master node.

11. The network time synchronization management method of claim 10, further comprising transmitting the request by a plurality of slave nodes, wherein the slave nodes conduct an arbitration process to select one of the available master nodes to be the working master node.

12. The network time synchronization management method of claim 11, further comprising conducting, by the slave nodes, the arbitration process using a telemetry message conveyed among the slave nodes, wherein the first and second communication sessions conform to an IEEE 1588 protocol.

13. The network time synchronization management method of claim 8, further comprising receiving the request as a result of a trigger event from a communication channel through the slave node.

14. A computer-readable storage device storing instructions which, when executed by a processor, cause the processor to perform operations comprising:
receiving a request to synchronize a slave node with a working master node, the slave node coupled to the working master node through at least one boundary node;
establishing a first communication session between the boundary node and the slave node, the first communication session configured to measure a first timing delay from the boundary node to the slave node;
establishing a second communication session between the working master node and the slave node through the boundary node, the second communication session configured to measure a second timing delay from the working master node to the slave node;
adjusting a timing delay correction factor according to the first timing delay and the second timing delay; and
synchronizing the slave node with the working master node according to the adjusted timing delay correction factor;
wherein the first and second communications sessions are different from each other.

15. The instructions of claim 14, further comprising displaying the adjusted timing delay correction factor on a display.

16. The instructions of claim 14, further comprising receiving the request according to at least one of a manual request and at one of a plurality of automated requests issued at ongoing intervals.

17. The instructions of claim 14, further comprising:
   identifying a plurality of available master nodes in the communication network;
   establishing the first and second communication sessions, adjust the timing delay correction factor, and synchronize the slave node on each of the available master nodes; and
   selecting one of the available master nodes to be the working master node based upon the adjusted timing delay correction factor determined for each available master node.

18. The instructions of claim 17, further comprising transmitting the request by a plurality of slave nodes, wherein the slave nodes conduct an arbitration process to select one of the available master nodes to be the working master node.

19. The instructions of claim 18, further comprising conducting, by the slave nodes, the arbitration process using a telemetry message conveyed among the slave nodes, wherein the first and second communication sessions conform to an IEEE 1588 protocol.

20. The instructions of claim 14, further comprising receiving the request as a result of a trigger event from a communication channel through the slave node.

* * * * *